3,417,063
POLYMERIC COMPOSITIONS OF MATTER
FORMED BY THE REACTION OF PREPOLY-
MERS WITH POLYHALOPOLYHYDRODI-
METHANONAPHTHALENEDICARBOXYL-
IC ACIDS AND ANHYDRIDES THEREOF
Morris Dunkel, Paramus, N.J., assignor to Universal Oil
Products Company, Des Plaines, Ill., a corporation of
Delaware
No Drawing. Filed Dec. 30, 1963, Ser. No. 334,551
18 Claims. (Cl. 260—78.4)

This invention relates to polymeric compositions of matter and particularly to polymeric compositions of matter containing, as one component thereof, a polyhalopolyhydrodimethanonaphthalenedicarboxylic acid or anhydride thereof.

The polymeric compositions of matter which are prepared according to the process of this invention in a manner hereinfater set forth in greater detail will possess many particular and desirable physical properties which make these particular compounds desirable and commercially attractive. For example, the polymers which may be prepared by treating a prepolymer with a polyhalopolyhydrodimethanonaphthalenedicarboxylic acid or anhydride thereof will possess fire retardant properties superior, in many instances, to other polymeric compositions of matter now in use. This property will be found to be of special advantage when preparing plastic materials to be utilized in places subject to excesive heat or possible flames, such uses including architectural panelling for construction work, ash trays, wall plugs for electrical connections, etc. In addition, the finished polymeric composition of matter when utilized to prepare polyurethane foams, will possess a high degree of fire resistance and therefore may be used for insulation where the aforementioned fire resistance is of primary concern. Furthermore, by utilizing a polyhalopolyhydrodimethanonaphthalenedicarboxylic acid or anhydride thereof as a constituent in the finished polymer, said product will be resistant to a large extent, to discoloration as compared with polymeric products which have been prepared utilizing other chlorinated cyclic derivatives. The acid or anhydride, due to its stability, and resistance to deterioration, will thus make it an attractive constituent of plastic materials or polymers which are colorless and should remain so, or which are colored and will not darken, lighten or turn another color.

The color stability of products derived from polyhalopolyhydrodialkanonaphthalenedicarboxylic acids and anhydrides thereof compared with similar compounds would not be expected based on current theoretical reasoning. Because alkylated cyclohexanes are known to undergo autoxidation readily, it might be predicted that polyhalopolyhydrodialkanonaphthalenedicarboxylic acids and anhydrides thereof would be rapidly attaced by atmospheric oxygen and susceptible to free radical reactions catalyzed by light. Such attack should lead initially to hydroperoxide formation at the various ring junctions as well as at the positions alpha to the carboxyl groups. Decomposition of the hydroperoxides would lead to formation of alcohols, ketones, olefins, ring opening and further attack on the susceptible methylene carbon atoms. The products of these reactions which might be aromatic compounds, quinones and condensed materials would liberate hydrogen chloride and form highly colored products. The reason that these processes fail to occur with polyhalopolyhydrodialkanonaphthalenedicarboxylic acids and anhydrides thereof has not been proven at this time. The term "prepolymer" as used hereinafter in the present specification and appended claims will refer to compositions of matter, comprising the reaction product of polymerizable monomers, containing reactive functional substituents which will react with the polyhalopolyhydrodimethanonaphthalenedicarboxylic acid or anhydride thereof in a chemical manner to thus prepare the finished and desired composition of matter.

In addition to the aforementioned properties of color stability and flame retardancy which the finished polymers prepared utilizing the polyhalopolyhydrodimethanonaphthalenedicarboxylic acids or anhydrides thereof possess, it has been found that the aforementioned acids or anhydrides are soluble to an unexpected extent in the prepolymers. This solubility was, as hereinbefore set forth, unexpected in view of the fact that a tricyclic polyhalopolyhydrodicarboxylic acid or anhydride thereof is relatively soluble in certain of the prepolymers while a tetracyclic polyhalopolyhydrodicarboxylic acid or anhydride thereof is less soluble. Therefore, it would be expected that a polyhalopolyhydrodimethanonaphthalenedicarboxylic acid or anhydride thereof which is hexacyclic in nature would be less soluble than either the tricyclic or tetracyclic compounds. This solubility is advantageous in many instances when the acids or anhydrides of the type utilized in the present invention are admixed with prepolymers to form the desired final composition of matter, the admixture with the prepolymers therefore being accomplished at relatively lower temperatures and pressures and with a lesser amount of prepolymer being utilized to prepare the desired finished product.

It is therefore an object of this invention to provide novel compositions of matter which possess desirable properties of flame retardancy and high color stability.

Another object of this invention is to provide novel compositions of matter by reacting certain prepolymeric compounds with a polyhalopolyhydrodimethanonaphthalenedicarboxylic acid or anhydride thereof to prepare compounds possessing valuable physical properties.

Taken in its brodest aspect one embodiment of this invention resides in a composition of matter comprising the reaction product of a polymer containing at least one reactive functional group with a compound selected from the group consisting of polyhalopolyhydrodimethanonaphthalenedicarboxylic acids and anhydrides thereof.

A further embodiment of this invention is found in a composition of matter comprising the reaction product of a polymer containing at least one reactive functional group and 5,6,7,8,9,9-hexachloro-1,2,3,4,4a,5,8,8a-octahydro-1,4,5,8-dimethano-2,3-naphthalenedicarboxylic acid.

A specific embodiment of this invention resides in a composition of matter comprising the reaction product of a polyester containing at least one reactive functional group and 5,6,7,8,9,9-hexachloro-1,2,3,4,4a,5,8,8a-octahydro-1,4,5,8-dimethano-2,3-naphthalenedicarboxylic anhydride Other objects and embodiments will be found in the following further detailed description of this invention.

As hereinbefore set forth, it has now been discovered that polyhalopolyhydrodimethanonaphthalenedicarboxylic acids or anhydrides thereof of the type hereinafter set forth in greater detail, may be reacted with prepolymeric compositions of matter to form finished polymers which will possess desired physical properties. Examples of prepolymers which will contain at least one reactive functional group, said reactive functional group being capable of reacting with a polyhalopolyhydrodimethanonaphthalenedicarboxylic acid or anhydride thereof to form the desired product, will include polymers generically referred to as epoxy resins, urethanes, polyamides, polyamines, polyols and polyesters. The particular polyhalopolyhydrodimethanonaphthalenedicarboxylic acid or anhydride thereof will act to a certain extent as a curing agent or cross-linking agent and thus, enable the finished product to possess the desired physical characteristics and stability to possible deterioration, a particular example of this being a superior stability against discoloration due to deterioration of the particular polymeric product as compared to other products utilizing chlorinated compounds which add fire retardance to the finished product, but not color stability. By utilizing a polyhalopolyhydrodimethanonaphthalenedicarboxylic acid or anhydride thereof of the type hereinafter set forth in greater detail, the finished product, as hereinbefore set forth, will possess a relatively high resistance to discoloration due to the structural configuration of the acid or anhydride which is used as the curing agent or cross-linking agent.

As hereinbefore set forth, the present invention is directed to polymeric products or composition of matter in which one of the elements contained therein comprises a polyhalopolyhydrodimethanonaphthalenedicarboxylic acid or anhydride thereof, this compound imparting desired physical properties to the finished product. The polyhalopolyhydrodimethanonaphthalenedicarboxylic acid or anhydride thereof may be prepared by condensing a conjugated cycloalkadiene with an unsaturated dicarboxylic acid or anhydride in a Diels-Alder type condensation at an elevated temperature in the range of from about 80° up to about 250° C. or more and at a pressure sufficient to maintain a major portion of the reactants in the liquid phase, said pressures usually being in a range of from about atmospheric to about superatmospheric or more. In addition, if so desired, the condensation may be effected in the presence of an inert organic solvent including aromatic solvents such as benzene, toluene, the xylenes, etc.; acyclic and cyclic paraffins such as pentane, hexane, heptane, cyclopentane, methylcyclopentane, etc. Examples of conjugated cycloalkadienes which may be used include 1,3-cyclopentadiene (hereinafter referred to as cyclopentadiene), 1,3-cyclohexadiene, etc. Olefinic dicarboxylic acids which may be used include maleic acid, fumaric acid, itaconic acid, citraconic acid, maleic anhydride, etc. The resultant bicyclic dicarboxylic acid or anhydride thereof is then further condensed with a halogenated cycloalkadiene, said condensation also being of the Diels-Alder type. This condensation is effected at elevated temperatures in the range of from about 50° up to about 250° C. or more, the preferred range being from about 100° to about 200° C. and at atmospheric or superatmospheric pressures ranging up to about 100 atmospheres or more, the pressure again being sufficient so as to maintain a major portion of the reactants in the liquid phase at the particular temperature at which the condensation is effected. As in the first condensation, the second condensation may also be effected in the presence of an inert organic solvent of the type hereinbefore set forth. Examples of halo substituted cycloalkadienes which may be used include chloro-substituted 1,3-cyclopentadiene (hereinafter referred to as cyclopentadiene) such as 1-chlorocyclopentadiene, 1,5-dichlorocyclopentadiene, hexachlorocyclopentadiene, etc. Other cycloalkadienes containing halogen substituents which may be used include pentachlorocyclohexadiene, pentachlorocyclopentadiene, hexabromocyclopentadiene, etc.

A specific example of the two condensations hereinbefore set forth is the condensation of 1,3-cyclopentadiene and maleic anhydride to form norborn-5-ene-2,3-dicarboxylic anhydride. The norborn-5-ene-2,3-dicarboxylic anhydride may then be further condensed with hexachlorocyclopentadiene to form 5,6,7,8,9,9-hexachloro - 1,2,3,4,4a,5,8,8a - octahydro - 1,4,5,8 - dimethano-2,3-naphthalenedicarboxylic anhydride.

Examples of polyhalopolyhydrodimethanonaphthalenedicarboxylic acids or anhydrides thereof which may be prepared include 5,6,7,8,9,9-hexachloro-1,2,3,4,4a,5,8,8a-octahydro-1,4,5,8 - dimethano - 2,3 - naphthalenedicarboxylic acid, 5,6,7,8,9,9 - hexachloro - 1,2,3,4,4a,5,8,8a - octahydro-1,4,5,8-dimethano-2,3-naphthalenedicarboxylic anhydride, 5,6,7,8,9,9 - hexabromo - 1,2,3,4,4a,5,8,8a - octahydro-1,4,5,8-dimethano-2,3-naphthalenedicarboxylic acid, 5,6,7,8,9,9 - hexabromo - 1,2,3,4,4a,5,8,8a - octahydro-1,4, 5,8-dimethano-2,3-naphthalenedicarboxylic anhydride, etc.

As hereinbefore set forth, the aforementioned polyhalopolyhydrodimethanonaphthalenedicarboxylic acids or anhydrides thereof are reacted with certain polymeric compositions of matter containing at least one reactive functional group. An example of these polymeric products comprises epoxy resins which may be cured by the addition of the polyhalopolyhydrodimethanonaphthalenedicarboxylic anhydride.

The epoxy resins which are used for formed by the reaction of a 1,2-epoxy compound and a dihydric phenol or polyalcohol to form polyethers usually having alternating aromatic and aliphatic centers. A particularly applicable epoxy resin is formed by the reaction of epichlorohydrin with the condensation product of a phenol and acetone known as Bisphenol A [2,2-bis-(4-hydroxyphenol) propane] generally in an alkaline solution such as sodium hydroxide, potassium hydroxide, etc. The resulting product which is an uncured epoxy resin of a relatively low molecular weight possesses a high degree of polarity, the polar groups of the resins including the ether linkages, the secondary hydroxyl groups and the terminal epoxide groups. In addition to the aforementioned particular resin, other epoxy resins may also be prepared from other 1,2-epoxy compounds including by way of illustration, 1,2-epi-3-chlorobutane, 1,2-epi-3-chloropentane, 1,2-epi-3-chlorohexane, dichlorohydrin, butadienedioxide, polyglycidyl ethers of polyols such as ethylene glycol, propylene glycol, trimethylene glycol, diethylene glycol, triethylene glycol, dipropylene glycol, glycerol, etc. Other dihydric phenols or polyols which may be employed include resorcinol, catechol, hydroquinone, 4,4'-dihydroxybenzophenone, 1,1-bis-(4-hydroxyphenyl)-ethane, 1,1-bis-(4-hydroxyphenyl)-butane, 2,2 - bis - (4-hydroxyphenyl)-butane, (Bis-Phenol-B), 1,5-dihydroxynaphthylene, etc. It is to be understood that the term "polyols" as used hereinafter in the present specification and appended claims will refer to both aliphatic and aromatic polyhydroxy compounds. Epoxy resins also may be prepared by the reaction of a 1,2-epoxy compound and particularly epichlorohydrin with poly alcohols including, for example, ethylene glycol, propylene glycol, trimethylene glycol, diethylene glycol, triethylene glycol, glycerol, erythritol, pentaerythritol, mannitol, sorbitol, polyallyl alcohol, polyvinyl alcohol, etc. It is understood that the epoxy resins formed from the various reactants mentioned above are not necessarily equivalent and, furthermore, that the exact composition of the epoxy resin is dependent upon the molecular proportions of the epoxy compound and dihydric phenol or polyalcohol employed in its preparation.

Regardless of the method of preparation, the uncured epoxy resin must be cured in order to form the desired final product which possesses the physical characteristics necessary for its use in the various fields hereinafter set forth in greater detail. In many cases, the epoxy resin is recovered as a viscous liquid and is converted by curing into a final hard product. In other cases, the epoxy resin is a semi-solid or solid which is soluble in suitable organic solvents or liquefied by mild heating and then converted into the desired final product by proper curing. As hereinbefore set forth, the present invention is concerned with a process for curing uncured epoxy resins utilizing a novel curing agent for the purpose thereof. By use of this type of curing agent, which in this case, comprises a polyhalo-octahydrodialkanonaphthalenedicarboxylic acid or anhydride thereof, the final epoxy resin in its cured state will possess many desirable properties, among which is flame retardancy. The ability to retard flames is of primary importance in many instances, especially when the plastic article is to be used under circumstances whereby a fire may easily break out, such as when used near high temperature surfaces, sources of heat, in electric contacts, etc.

The aforementioned acid or anhydride will react with the epoxy resin by condensing with the reactive epoxy or oxirane group present in the molecule to form a crosslinked tri-dimensional structure. In the process of the present invention the curing agent herein described preferably is used in a concentration within the range of from about 5 to about 200% by weight of the epoxy resin and more particularly near that governed by the stoichiometry of the reaction. The curing of the epoxy resin is effected in any suitable manner, the temperature and time of heating and concentration of the curing agent being dependent upon the specific epoxy resin which is employed. In the preferred embodiment, the curing agent is used in a concentration of approximately equivalent weight to the epoxy resin. This may be calculated on the basis on the number of carboxyl groups in the curing agent and on the weight thereof. In the present invention the curing agent may be present in a range of from about 0.5 to about 1.5 equivalents per equivalent of oxirane oxygen. When desiring a cured resin which will possess a high degree of flame retardancy it is preferable to incorporate the curing agent into the epoxy resin in such a manner so that the finished product will contain a relatively high concentration of curing agent. This, in turn, is related to the epoxy equivalent weight of the specific resin. However, it is understood that a lower or higher concentration of the curing agent may be employed if so desired.

The specific curing procedure which is effected utilizing the particular curing agents of the present invention and the desired epoxy resin will be effected according to the particular application which is desired of the finished resin. In one embodiment the curing agent is commingled with the epoxy resin and then later heated to an elevated temperature. Inasmuch as the curing agents of the present invention are solid, at room temperature, elevated temperatures will have to be employed in order to dissolve the curing agent in the epoxy resin. After the curing agent has dissolved in the resin, the mixture may then be placed in suitable molds and allowed to cure at a predetermined temperature into a desired pattern. In another embodiment, the curing agent is mixed with the epoxy resin, the mixture is heated to dissolve said curing agent following which the mixture may be used as a bonding agent in laminates which may be cured and pressed at the same time. As hereinbefore set forth, it is understood that any suitable method of effecting the curing may be employed, the specific procedure being dependent upon the particular application of the epoxy resin.

When desired, a suitable solvent, filler, thixotropping agent, diluent, etc., may be incorporated in the epoxy resin and/or the curing agent prior to curing. When the resin is supplied as a solid, it may be dissolved in a suitable solvent, and the curing agent intimately admixed therein. Any suitable solvent may be employed. Illustrative solvents include ketones as acetone, methyl ethyl ketone, methyl isobutyl ketone, isophorone, etc., ethers as dimethyl, diethyl or dibutyl ether of ethylene glycol or diethylene glycol, etc., chlorinated solvents such as trichlodopropane, trichlorobutane, chloroform, etc. The filler to be employed will depend upon the purpose for which the epoxy resin is to be used. Illustrative fillers include powdered metals and metal oxides such as powdered iron oxide, aluminum oxide, etc., copper, aluminum, etc., silica, inorganic silicates, sand, glass, asbestos, carbon, calcium carbonate, etc. In order to prevent the filler from settling during curing, an organophilic thixotropping agent may be employed and this may be selected from any of the suitable commercially available materials. Diluents such as hydrocarbons including, for example, benzene, toluene, xylene, ethylbenzene, cumene, etc., may be employed, particularly with liquid resins. This serves to reduce the viscosity and to increase the useful pot life without seriously affecting the final properties of the resin. It is important that the curing agent be intimately mixed with the resin, and this may be accomplished by hand mixing with a paddle, particularly in batch operations, by the use of a mechanical rotating blade in continuous or batch operations, or in any other suitable manner.

The temperature of the curing as hereinbefore set forth, is effected at elevated temperatures ranging from about 120° to about 300° C. or more and preferably within a range of from about 125° to about 250° C. The time of heating also will depend upon the particular epoxy resin and curing agent employed, as well as the use to be made of the resin. The time generally will be from about 10 minutes to 20 hours or more, depending upon whether it is a fast or slow cure. In general, shorter times are employed with higher temperatures and, likewise, longer times with lower temperatures. While the curing may be effected at atmospheric pressure, superatmospheric pressure may be utilized in the curing and may range up to 5000 pounds per square inch. The curing is an exothermic reaction and, when desired, means for controlling the heat of reaction may be employed. By utilizing the particular polyhalopolyhydrodimethanonaphthalenedicarboxylic anhydride, the resultant product will be stable in regard to color, said stability being of particular advantage when utilizing the resins for certain specific purposes, such as floor surfacing, coatings, etc., and, in addition, due to the relatively greater solubility of the acid or anhydride with the epoxy resin, the curing of the resin may be effected in an easier manner, that is, by utilizing lower temperatures and pressures as well as a lesser amount of epoxy resin to dissolve the acid or anhydride.

Another polymeric product which may be reacted with the acid or anhydride of the type hereinbefore set forth comprises the polyurethanes prepared from prepolymers in which the reactive functional group is an isocyanate end group. The particular prepolymer to be treated with the acid or anhydride will be prepared by reacting a polyester with an excess of an isocyanate such as tolylene diisocyanate, polymethylene polyphenyl isocyanate, diphenylmethane 4,4′-diisocyanate, p,p-diphenylmethane diisocyanate, etc. The resulting prepolymer will be a linear low molecular weight product. The prepolymer is then cured by reaction with a polyhalopolyhydrodimethanonaphthalenedicarboxylic acid or anhydride to form the desired product. The curing of the prepolymer by the addition of the acid or anhydride results in the crosslinking or chain extension of the polymer to give higher molecular weight compounds. These compounds may be prepared in foam form by incorporating a foaming agent such as water, alcohol, etc. during the curing step. This final product will then possess the desired physical properties of the type hereinbefore set forth, that is, a high stability as regards color changes due to deterioration. In addition to being used as a foam, the urethanes may be used as coatings, said coatings having desirable characteristics as compared to other urethanes which have been prepared utilizing other chlorinated cyclic compounds, such characteristics including being fast drying, possessing a hard surface, a deep gloss, a high resistance to abrasion and weathering as well as an excellent resistance to fire. When utilizing these urethanes as coatings of this type, it is necessary in many instances that the coating also have a high resistance to changes in color especially when being exposed to climatic conditions of sun, heat, cold, etc. By utilizing a polyhalopolyhydrodimethanonaphthalenedicarboxylic acid or anhydride of the type set forth in the present invention, the coating will possess fire retardancy as well as the necessary physical characteristics and retain the desired color for a longer period of time than will urethane coatings which do not contain this particular acid or anhydride but contain other chlorinated cyclic derivatives. The particular acid or anhydride which is used will also be relatively more soluble in the polyurethane than will other acids or anhydrides of similar configuration but containing a lesser amount of cyclic rings.

Yet another example of prepolymers containing an excess of at least one reactive functional group which may be reacted with the polyhalopolyhydrodimethanonaphthalenedicarboxylic acid or anhydride comprises polyamides. These polyamides may be prepared by condensing a polyamine with a dibasic acid. Examples of these polyamides would be the condensation of an amine containing more than two functional groups such as diethylenetriamine, dipropylenetriamine, etc., or with a molar excess of a diamine such as ethylenediamine, propylenediamine, etc., with a dibasic acid such as adipic acid, sebacic, acid, etc., to form a prepolymer, said prepolymer containing a reactive functional amine group which may then be cross-linked with a polyhalopolyhydrodimethanonaphthalenedicarboxylic acid or anhydride thereof. This cross-linking may be done at temperatures ranging from about 200° up to about 300° C. or more. The resulting cured or cross-linked polyamide may then be used for molding resins, films, coatings, insulation, etc., the finished product again exhibiting the desired physical properties of being flame resistant and also being resistant to color changes due to the stability of the polyhalopolyhydrodimethanonaphthalenedicarboxylic acid or anhydride thereof which is utilized in the preparation as contrasted to other polyamine compounds which contain chlorinated cyclic derivatives.

Another prepolymer which may be cured or cross-linked by the use of the aforementioned acid or anhydride thereof are polyesters which have been formed by the reaction of a dibasic acid, such as adipic acid with a molar excess of a glycol, or with a polyhydroxy compound which contains more than two —OH groups such as a hexanetriol. The resulting polyester may then be cross-linked utilizing a polyhalopolyhydrodimethanonaphthalenedicarboxylic acid or anhydride thereof to form the desired products. For example, polyester resins may be cross-linked with an acid or anhydride of this type to form alkyds which will possess both flame retardant and color stable properties. In addition to their use as coatings, the cross-linked polyesters may be used for molding and casting polymers which also possess the aforementioned desired physical characteristics.

The prepolymers of the type hereinbefore set forth which contain an excess of at least one reactive functional group, and the polyhalopolyhydrodimethanonaphthalenedicarboxylic acid or anhydride thereof may be reacted in any manner known in the art, the reaction conditions such as temperature and pressure being dependent upon the particular compounds undergoing curing or cross-linking. Usually the curing or cross-linking of the prepolymer with the particular acid or anhydride thereof will be effected at temperatures ranging from room temperature (about 25° C.) up to about 300° C. or more. In addition, the acid or anhydride thereof will be present in the finished reaction product in various concentrations, ranging from about 5% to about 60% or more of the finished product, the particular concentration again being dependent upon the particular use to which the finished polymeric product will be put. The particular acid or anhydride which is utilized in this invention will also be more soluble in the polyamides and polyesters hereinbefore set forth in greater detail than will other compounds of similar nature and configuration, and may thus be utilized in an easier manner than will compounds of similar configuration but containing a dissimilar number of rings.

The following examples are given to illustrate the process of the present invention which, however, are not intended to limit the generally broad scope of the present invention in strict accordance therewith.

Example I

The curing agent in this example comprises 5,6,7,8,9,9-hexachloro - 1,2,3,4,4a,5,8,8a - octahydro - 1,4,5,8 - dimethano - 2,3 - naphthalenedicarboxylic anhydride which was prepared by condensing maleic anhydried with 1,3-butadiene to form 5,6-norborn-2-ene dicarboxylic anhydride. The latter compound was then further condensed with hexachlorocyclopentadiene to form the desired product.

5,6,7,8,9,9 - hexachloro - 1,2,3,4,4a,5,8,8a - octahydro-1,4,5,8 - dimethano - 2,3 - naphthalenedicarboxylic anhydride, prepared in the above manner, was used as an epoxy curing agent. The epoxy resin used in this example is marketed under the trade name of "Epon 828" by the Shell Chemical Corporation. This resin is a liquid at room temperature and is said to have a viscosity at 25° C. at 100–160 poises, a maximum Gardener color of 8, an epoxide equivalent (grams of resin containing 1 gram equivalent of epoxide) of 175–210 and a weight of 9.7 gallons per pound at 20° C. To cure the epoxy resin 25 grams of the curing agent and 30 grams of the epoxy resin were placed in an apparatus provided with heating means and the mixture slowly heated. The curing agent was fully dissolved at 135° C. After the 5,6,7,8,9,9-hexachloro - 1,2,3,4,4a,5,8,8a - octahydro - 1,4,5,8 - dimethano-2,3-naphthalenedicarboxylic anhydride was fully dissolved the mixture was poured into a glass mold which was separated by ⅛″ spacers and cured at a temperature of 150° C. for a period of 17 hours.

The cured epoxy resin which had a hardness of 82 (Shore D) was tested for flame retardancy by subjecting said resin to the direct action of a flame. The resin very slowly burned with the emission of light fumes when in direct contact with a flame. However, when the resin was removed from the direct action of the flame, it did not burn.

Example II

In this example a polyester is prepared by reacting 146 g. (1.0 mole) of adipic acid and 106 g. (1.0 mole) of diethylene glycol with heating for a predetermined period of time at a temperature of about 150° C. The mixture is then cured by reaction with 437 g. (1.0 mole) of 5,6,7,8,9,9 - hexachloro - 1,2,3,4,4a,5,8,8a - octahydro-1,4,5,8-dimethano-2,3-naphthalenedicarboxylic anhydride to form the desired product. This product possesses excellent color stability, said product retaining the original color for a relatively long period of time as compared to other polyesters which are prepared utilizing other chlorinated cyclic compounds, as well as exhibiting excellent fire retardant properties.

Example III

In this example a prepolymer is prepared by condensing 103 g. (1.0 mole) of diethylenetriamine with 146 g. (1.0 mole) of adipic acid. The prepolymer is then cured by reacting said prepolymer with 437 g. (1.0 mole) of 5,6,7,8,9,9 - hexachloro-1,2,3,4,4a,5,8,8a - octahydro - 1,4, 5,8-dimethano-2,3-naphthalenedicarboxylic anhydride to form a polymer which, as in the case in the polymers formed in the above examples, possesses an excellent color stability and flame retardancy as contrasted to other polymers of similar type which are prepared by using other chlorinated cyclic compounds which possess fire retardant, but not color stability, properties.

Example IV

A prepolymer is formed by condensing 98 g. (1.0 mole) of maleic anhydride with 134 g. (1.0 mole) of 1,2,6-hexanetriol at an elevated temperature at about 150° C. to form a polyester. This polyester which comprises the prepolymer is cured or cross-linked by reacting said polyester with 437 g. (1.0 mole) of 5,6,7,8,9,9-hexacholor - 1,2,3,4,4a,5,8,8a - octahydro-1,4,5,8 - dimethano-2,3-naphthalene-dicarboxylic anhydride also at an elevated temperature to prepare a cured polyester resin which possesses excellent color stability and flame retardant properties.

I claim as my invention:

1. A composition of matter comprising the polymeric reaction product of a polymer containing at least one reactive functional group and selected from the group consisting of epoxy resins, urethanes, polyamides, polyamines, polyols and polyesters with a compound selected from the group consisting of polyhalopolyhydrodimethanonaphthalenedicarboxylic acids and anhydrides thereof in sufficient amount to impart flame retardancy to the composition.

2. A composition of matter comprising the polymeric reaction product of a polymer containing at least one reactive functional group and selected from the group consisting of epoxy resins, urethanes, polyamides, polyamines, polyols and polyesters with 5,6,7,8,9,9-hexachloro - 1,2,3,4,4a,5,8,8a - octahydro - 1,4,5,8 - dimethano-2,3-naphthalenedicarboxylic acid in sufficient amount to impart flame retardancy to the composition.

3. A composition of matter comprising the polymeric reaction product of a polymer containing at least one reactive functional group and selected from the group consisting of epoxy resins, urethanes, polyamides, polyamines, polyols and polyesters with 5,6,7,8,9,9-hexachloro - 1,2,3,4,4a,5,8,8a - octahydro - 1,4,5,8 - dimethano-2,3-naphthalenedicarboxylic anhydride in sufficient amount to impart flame retardancy to the composition.

4. A composition of matter comprising the polymeric reaction product of a polymer containing at least one reactive functional group and selected from the group consisting of epoxy resins, urethanes, polyamides, polyamines, polyols and polyesters with 5,6,7,8,9,9-hexabromo-1,2,3,4,4a,5,8,8a - octahydro - 1,4,5,8 - dimethano - 2,3-naphthalenedicarboxylic acid in sufficient amount to impart flame retardancy to the composition.

5. A composition of matter comprising the polymeric reaction product of a polymer containing at least one reactive functional group and selected from the group consisting of epoxy resins, urethanes, polyamides, polyamines, polyols and polyesters with 5,6,7,8,9,9-hexabromo-1,2,3,4,4a,5,8,8a - octahydro - 1,4,5,8 - dimethano - 2,3 - naphthalenedicarboxylic anhydride in sufficient amount to impart flame retardancy to the composition.

6. A composition of matter as set forth in claim 1, in which said compound selected from the group consisting of polyhalopolyhydrodimethanonaphthalenedicarboxylic acids and anhydrides thereof is present in an amount of from 5 to about 60% by weight of the finished product.

7. A composition of matter comprising the polymeric reaction product of an epoxy resin containing at least one reactive functional group and 5,6,7,8,9,9-hexachloro-1,2,3,4,4a,5,8,8a - octahydro - 1,4,5,8 - dimethano - 2,3-naphthalenedicarboxylic anhydride in sufficient amount to impart flame retardancy to the composition.

8. A composition of matter comprising the polymeric reaction product of a urethane containing at least one reactive functional group and 5,6,7,8,9,9-hexachloro-1,2,3,4,4a,5,8,8a - octahydro - 1,4,5,8 - dimethano - 2,3 - naphthalenedicarboxylic anhydride in sufficient amount to impart flame retardancy to the composition.

9. A composition of matter comprising the polymeric reaction product of a polyamide containing at least one reactive functional group and 5,6,7,8,9,9-hexachloro-1,2,3,4,4a,5,8,8a - octahydro - 1,4,5,8 - dimethano - 2,3-naphthalenedicarboxylic anhydride in sufficient amount to impart flame retardancy to the composition.

10. A composition of matter comprising the polymeric reaction product of a polyester containing at least one reactive functional group and 5,6,7,8,9,9-hexachloro-1,2,3-4,4a,5,8,8a - octahydro - 1,4,5,8 - dimethano - 2,3 - naphthalenedicarboxylic anhydride in sufficient amount to impart flame retardancy to the composition.

11. The composition of claim 1 further characterized in that said polymer is an epoxy resin reaction product of epichlorohydrin with the condensation product of a phenol and acetone.

12. The composition of claim 7 further characterized in that said epoxy resin is the reaction product of epichlorohydrin with the condensation product of a phenol and acetone.

13. The composition of claim 1 further characterized in that said polymer is the polyester reaction product of adipic acid and diethylene glycol.

14. The composition of claim 10 further characterized in that said polyester is the reaction product of adipic acid and diethylene glycol.

15. The composition of claim 1 further characterized in that said polymer is the polyamide condensation product of diethylenetriamine with adipic acid.

16. The composition of claim 9 further characterized in that said polyamide is the condensation product of diethylenetriamine with adipic acid.

17. The composition of claim 1 further characterized in that said polymer is the polyester condensation product of maleic anhydride and 1,2,6-hexanetriol.

18. The composition of claim 10 further characterized in that said polyester is the condensation product of maleic anhydride and 1,2,6-hexanetriol.

References Cited

UNITED STATES PATENTS

| 2,557,808 | 6/1946 | Walker | 260—78 |
| 2,635,979 | 4/1953 | Lidov | 260—468 |
| 2,796,413 | 6/1957 | Baer | 260—78.4 |
| 2,929,800 | 3/1960 | Hill | 260—77.5 |

FOREIGN PATENTS

| 744,388 | 2/1956 | Great Britain. |

OTHER REFERENCES

Monatschefte fur Chemie Bond 91, 1960 Rundschneider et al., p. 30, QD 1M73 Copy in Scientific Library.

JOSEPH L. SHOFER, *Primary Examiner.*

J. A. DONAHUE, *Assistant Examiner.*

U.S. Cl. X.R.

260—78, 47, 75.5 77.5